350-377 SR
XR 3,639,744
7X4030W WP
X4035Y
SEARCH ROOM

United Sta
Hewitt

[15] 3,639,744
[45] Feb. 1, 1972

[54] MAGNETOOPTIC PHASE CORRELATOR

[72] Inventor: Fred G. Hewitt, St. Paul, Minn.
[73] Assignee: Sperry Rand Corporation, New York, N.Y.

[22] Filed: Dec. 17, 1969
[21] Appl. No.: 885,782

[52] U.S. Cl. ....................... 235/181, 340/174.1 M, 350/151
[51] Int. Cl. ....................................... G06g 7/19, G06g 9/00
[58] Field of Search ................. 235/181; 350/150, 151, 159; 340/174, 174.1 M

[56] References Cited

UNITED STATES PATENTS

| | | | |
|---|---|---|---|
| 3,284,785 | 11/1966 | Kornei | 340/174.1 |
| 3,500,361 | 3/1970 | Cushner | 340/174 |
| 3,284,632 | 11/1966 | Niblack et al. | 235/181 X |
| 3,167,751 | 1/1965 | Kellner et al. | 340/174.1 |
| 3,196,206 | 7/1965 | Griffiths | 340/174.1 |
| 3,394,360 | 7/1968 | Miyata | 340/174.1 |

*Primary Examiner*—Eugene G. Botz
*Assistant Examiner*—Felix D. Gruber
*Attorney*—Kenneth T. Grace, Thomas J. Nikolai and John P. Dority

[57] ABSTRACT

A data plane and a method of analyzing the data stored therein for use in a data signal recording and correlating system whereby received data signals are written into the data plane in a two-dimensional spatial relationship (along X, Y axes). The data plane includes a magnetizable recording medium which provides, upon readout, a Faraday rotation of orthogonally incident light beams that spatially conform to the received data signals. The degree of Faraday rotation is a function of the degree or level of the partial switching of the recording medium's magnetization through the thickness thereof and is, along the orthogonally oriented X, Y axes of the data plane, a linear function only if the received data signals are of a prescribed waveform. With such a linear Faraday rotation, the parallel light beams are passed through a quarter wave plate, an analyzer filter, and suitable optics to be focused upon a detector array. The detector array presents, as an output, signals that are indicative of the X, Y axes parameters.

28 Claims, 9 Drawing Figures

3639744
OR IN 364/728

INVENTOR
FRED G. HEWITT
BY Kenneth T. Grace
ATTORNEY

MAGNETO-OPTIC PHASE CORRELATOR

BACKGROUND OF THE INVENTION

The correlation process performed by the present invention detects the degree of linearity in a function of two variables and determines the best linearity constants. The function being examined can be masked so that the correlation process is performed only over certain regions or specific values of the independent variables. The mask can be variable or can be scanned over one or both of the independent variables. The correlation process is independent of the absolute value of the function and depends only on the rate at which the function is changing with respect to the two independent variables.

The correlation process can be expressed mathematically by considering the following function.

$$f(x,y)=K_o+K_x x+K_y y+g(x,y)$$

where $K_o$ is a constant, $K_x x$ is the linear term for one of the independent variables, $K_y y$ is the linear term for the other independent variable, and $g(x,y)$ contains cubic and higher order terms.

The correlation process determines the first derivatives of the function with respect to the two independent variables.

$$\frac{df}{dx}=K_x+\frac{dg}{dx}$$

$$\frac{df}{dy}=K_y+\frac{dg}{dy}$$

Maximum correlation is obtained when $g(x,y)$ is zero. The $g(x,y)$ function introduces noise and decreases the degree of correlation. The correlation is independent of $K_o$. The correlator will detect any combination of $K_x$ and $K_y$ and does so at a single instance (i.e., parallel data processing) without scanning the data plane. The data plane would most easily be written in series by scanning techniques employing one or more recording devices.

The preferred embodiment of the present invention is that of a multichannel received data signal recording and correlating system which records and correlates, in parallel, a plurality of amplitude modulated pulselike high-frequency signals which are of different carrier frequencies and which are of different pulse patterns. In the prior art, each of the separate channel data signal received pulse patterns has been recorded in a data plane by a process that may be termed "electron beam burnoff." In this prior art process, an electron beam, which is modulated by a separate channel received data signal pulse pattern is utilized to burn off selected portions of the data plane. A multichannel, multiapertured mask, whose apertures spatially along an X axis and an orthogonal Y axis correspond to a known multichannel pulse pattern, is used to permit the transmission therethrough of only polarized light beams whose spatial pattern corresponds to the received data signal pulse patterns that are to be investigated. If the composite (multichannel) received data signal is of a prescribed waveform the degree of burnoff along both the X axis and the Y axis is a linear function of the distance along such axes providing an equivalent optical wedge to the polarized light beam. The angle formed by the optical wedge is a function of the information in the received data signals, which angle is then optically treated to provide, as outputs, signals that are indicative of the X, Y axes parameters.

BRIEF SUMMARY OF THE INVENTION

A system for and a method of comparing a plurality of pulse patterns to provide a desired correlation therebetween. The preferred environment in which the present invention operates is that of the above described prior art multichannel received data signal recording and correlation system. Known pulse patterns are recorded in a multichannel multiapertured data mask whose apertures spatially along an X axis conform to the individual channel known data signal pulse patterns and along an orthogonal Y axis conform to the frequency of the individual channel known pulse pattern carrier signal frequency.

The parallel multichannel received pulse patterns are separately recorded in separate channels of a multichannel data plane, such as a continuously driven tapelike recording medium, having, with respect to an orthogonally incident light beam, a transparent base and a layer of magnetizable material. The multichannel optical apertures in the data mask spatially conform to the multichannel received data pulse patterns recorded in the data plane whereby an orthogonally incident light beam permits a magneto-optical phase correlation of the known and received data signals.

In the present invention the writing process establishes a corresponding varying level of partial switching of the magnetizable layer's magnetization that varies through the depth of the layer. The degree of partial switching of the magnetizable layer's magnetization provides, upon readout, a corresponding varying Faraday rotation of the orthogonally incident light beam. If the pattern of the degree of the corresponding varying partial switching of the data plane's magnetizable layer's magnetization as it varies through the depth of the layer, in mutually orthogonal directions in the plane of the data plane, i.e., along the X and Y axes, is a linear function of the distance along such directions, the resulting light beam that is emitted from the data plane may be optically passed through a quarter wave plate, having orthogonal optical axes that are aligned with the magnetizable layer's mutually orthogonal X and Y axes, and an analyzer filter, or polarizer, whose transmission axis bisects the quarter wave plate's orthogonal optical axes. The light beam is then optically focused upon a detector array consisting of a matrix array of photo detectors, which detects the degree of deflection of the light beam, if in phase, from the resulting light beam's optical axis. If the light beam when emitted from the analyzer filter is not in phase, due to the nonlinearity of the received data signal pulse patterns recorded in the data plane, no light beam is detected by the detector array. If the detector array is affected by a light beam, it provides, as an output, signals that are representative of the parameters of the X, Y axes. If the detector array is not affected by a light change, it provides, as an output, signals that indicate that no significant correlation between the known and the received data signals has occurred.

DESCRIPTION OF THE PREFERRED EMBODIMENT

Figure 1:
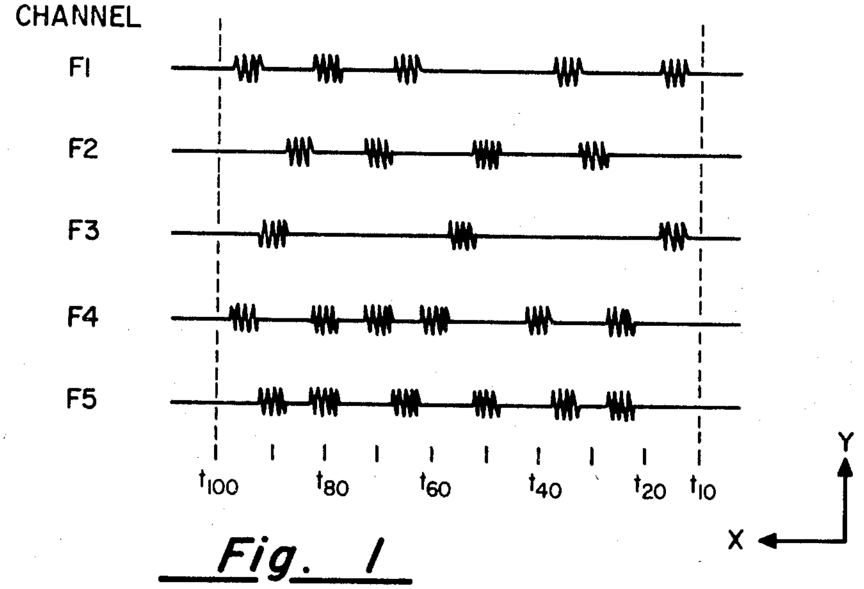
FIG. 1 is an illustration of an exemplary set of multichannel known pulse patterns F1–F5.

With particular reference to FIG. 1 there is presented a diagram of a known multichannel pulse pattern. Each channel is comprised of an amplitude-modulated pulselike high-frequency signal, each of different carrier frequencies F1, F2, F3, F4, F5 over a sample period of from 10 $\mu$s (microseconds) to 100

$\mu s$ which is of sufficient time duration to perform the desired correlation function. Each of the carrier signal frequencies, F1–F5, is preferably separated from each other by a sufficient margin to provide a reasonable nonconflicting band pass range for each of the individual pulse patterns while the individual pulse patterns may be of any predetermined arrangement such as unique pseudo random noise maximal length sequences. Such configurations are part of the prior art, and, accordingly, play no part in the novelty of the present invention; see the text "Digital Communications," S. W. Golomb, Ed., Prentice-Hall, Inc., 1964. The spatial plots of such carrier signal frequencies, F1–F5, are selected to have linearly increasing frequency magnitudes along the Y axis and to have linearly increasing time magnitudes along the X axis, both in the directions noted.

Figure 2:
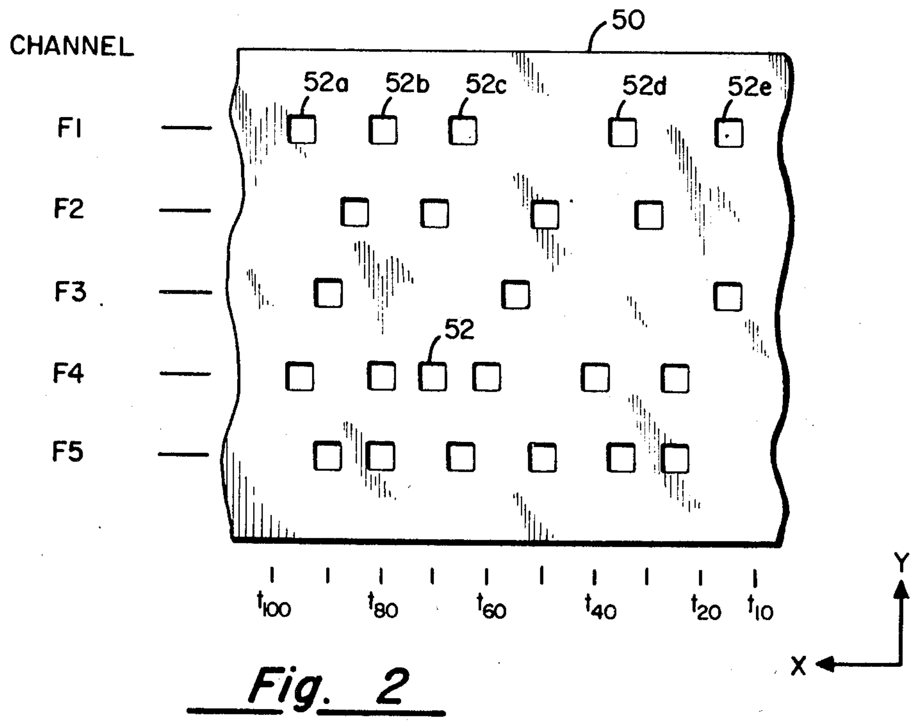
FIG. 2 is an illustration of a data mask that conforms to the known pulse patterns of FIG. 1.

With particular reference to FIG. 2 there is presented an illustration of a data mask 50 whose multichannel optical apertures 52 spatially conform to the individual channel known pulse patterns of FIG. 1. Data mask 50 is comprised of a material that is opaque to an orthogonally incident light beam having a plurality B of optical apertures 52 therethrough, through which the orthogonally incident light beam may pass. Apertures 52 are located in data mask 50 along associated data channels F1–F5 spatially conforming along their orthogonally oriented X and Y axes to the spatial plots of the individual pulse patterns along their respectively associated channels F1–F5 of FIG. 1.

Figure 3:
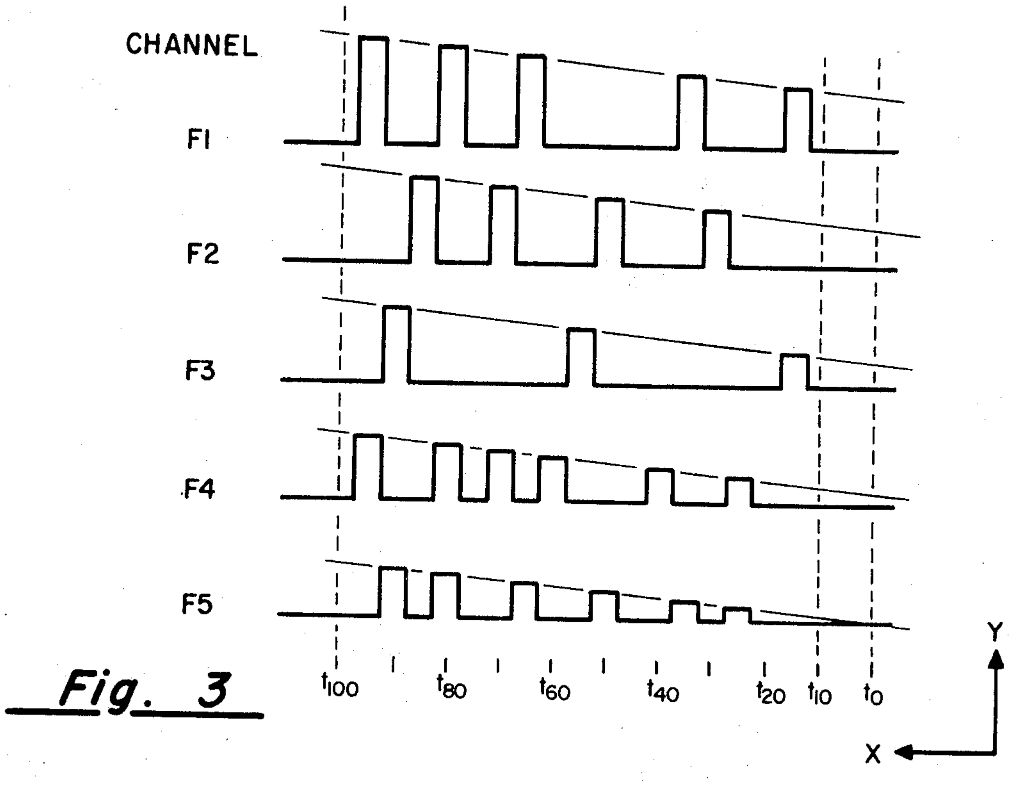
FIG. 3 is an illustration of an exemplary set of multichannel known pulse patterns of the prescribed linear waveforms corresponding to FIGS. 1 and 2.

With particular reference to FIG. 3 there is presented an illustration of an exemplary set of multichannel known pulse patterns of the prescribed waveforms that are electronically obtained from the pulse patterns of FIG. 1. Such FIG. 3 waveforms F1–F5 when plotted along mutually orthogonal X, Y axes are a linear analoglike varying function of the distance along such directions, being, e.g., linearly increasing in pulse amplitude along the X, e.g., time, axis and linearly increasing in pulse amplitude along the Y, e.g., frequency, axis. This linear relationship along the orthogonal X, Y axes permits the recording in a magnetizable data plane of a corresponding degree of linear, analoglike varying level of partial switching which, in turn, functions, through a corresponding Faraday rotation of orthogonally incident light beams spatially conforming to the data mask, as an optical wedge similar to the prior art electron beam burnoff technique. This optical wedge elliptically polarizes the light beams that are transmitted through the data plane permitting subsequent optical treatment into X, Y axes components that are phase shift functions of the degree of correlation between the known pulse patterns, represented by the data mask, and the unknown pulse pattern, represented by the data plane. The known pulse patterns of FIG. 3, corresponding to the known pulse pattern of FIG. 1 and, accordingly, the data mask of FIG. 2, being derived therefrom provide maximum correlation therebetween.

Figure 4:
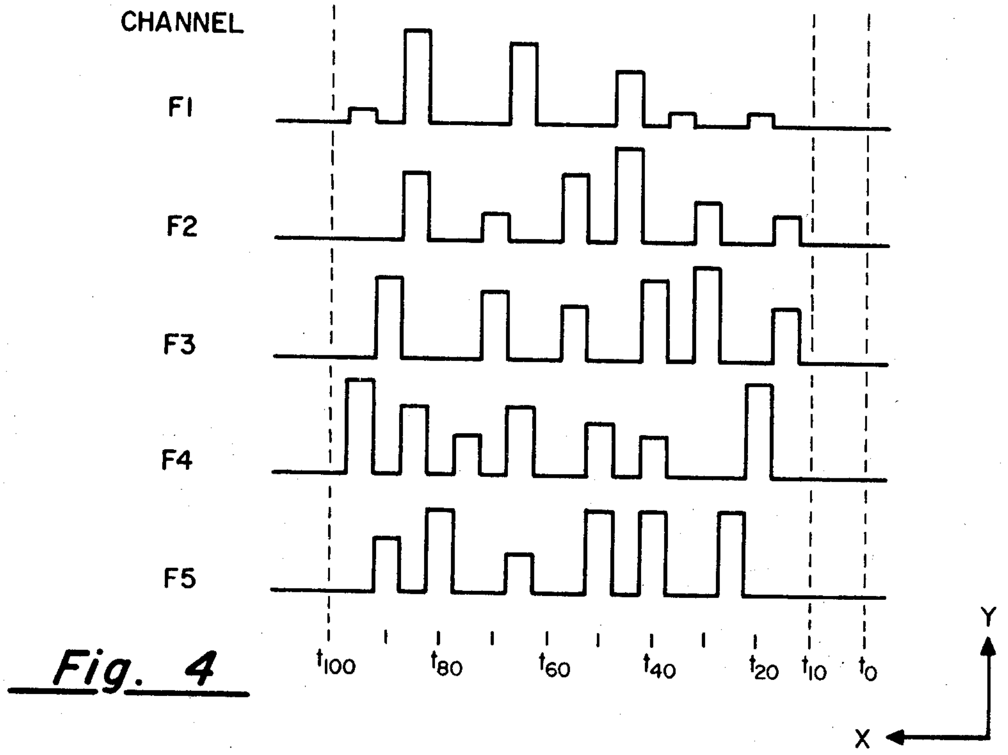
FIG. 4 is an illustration of an exemplary set of multichannel received pulse patterns not of the prescribed linear waveforms and not corresponding to FIGS. 1 and 2.

With particular reference to FIG. 4 there is presented an illustration of an exemplary set of multichannel unknown, or received, pulse patterns not of the prescribed waveforms, i.e., do not correspond to the known pulse patterns of FIG. 1. Such FIG. 4 waveforms F1–F5 when plotted along mutually orthogonal X, Y axes are not a linear function of the distance along such directions being of a random pulse amplitude along the X, e.g., time, axis and along the Y, e.g., frequency, axis. This nonlinear relationship along the X and Y axes does not permit the recording in a magnetizable data plane of a linear partial switching of the data plane's magnetization. Accordingly, no equivalent optical wedge is formed causing the light beams that are transmitted through the data plane to be randomly polarized, and through random interference to provide no significant output signal representative of minimum correlation therebetween.

Figure 5:
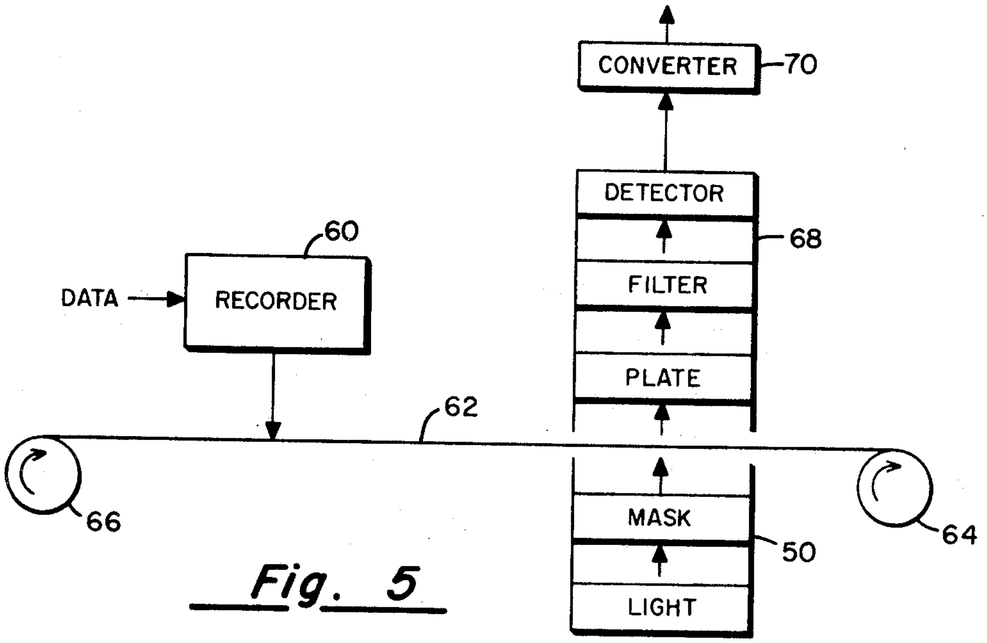
FIG. 5 is an illustration of a block diagram of the record-read-analyze system of the present invention.

With particular reference to FIG. 5 there is presented a block diagram of the record-read-analyze system of the magneto-optical phase correlator of the present invention. The block diagram of FIG. 5 essentially consists of a system for and a method of comparing known pulse patterns to received, or unknown, pulse patterns to provide a desired correlation therebetween. Data, in the form of a plurality of parallel received pulse patterns are, by means of recorder 60, recorded in a multichannel data plane 62, such as a continuously driven tapelike recording medium, having, with respect to an orthogonally incident light beam, a transparent base and a layer of transparent magnetizable material. In the present invention, the multichannel writing process establishes in each of the parallel channels F1–F5 along data plane 62 an analoglike level of partial switching of the magnetizable layer's magnetization, which level corresponds to the corresponding amplitude of the corresponding data signal F1–F5. Data plane 62, by means of takeup reel 64 and supply reel 66, is caused to pass through the magneto-optical phase correlator 68 which through converter 70 provides, as an output, signals that are representative of the comparison.

Figure 6:
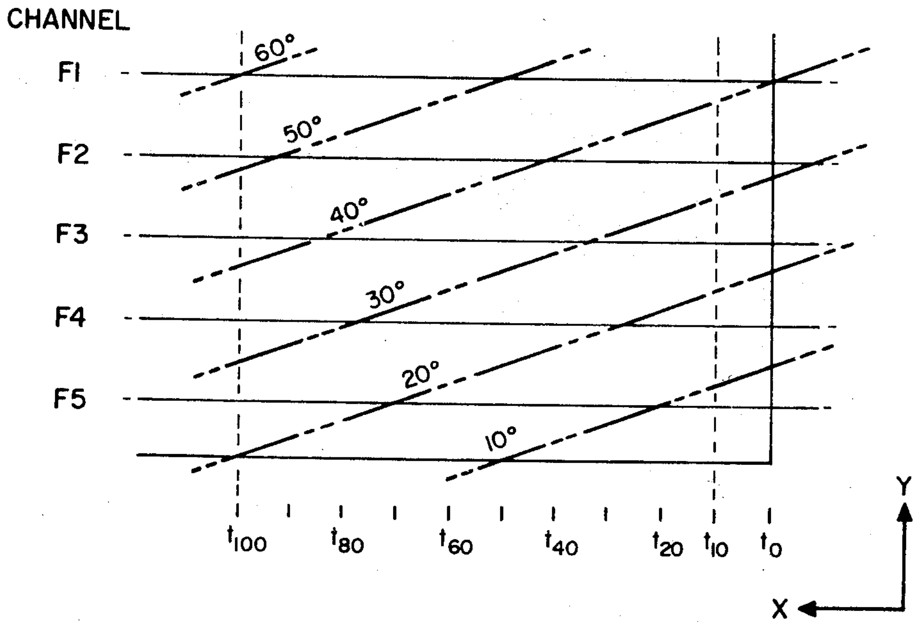
FIG. 6 is an illustration of the spatial distribution of the respective degrees of Faraday rotation achieved by the data plane of the present invention.

With particular reference to FIG. 6 there is presented an illustration of the spatial distribution of the respective degrees of Faraday rotation achieved in data plane 62 by the pulse patterns of FIG. 3, such spatial distribution being a function of the linear relationships of the pulse amplitude and channel carrier frequency along the X and Y axes. It is apparent that with a different linear relationship along the X and Y axes the so formed optical wedge would merely be inclined at a different angle providing maximum correlation but at a different phase shift function and a correspondingly different output from magneto-optical phase correlation 68 and converter 70 of FIG. 5.

In FIG. 6, the assumed linearly changing Faraday rotation: along the frequency axis is 0° to 40° from $f_0$ to F1, respectively; along the time axis is 0° to 20° from $t_0$ to $t_{100}$, respectively. This relationship may be expressed as $$\phi(f,t)=\phi(f_0,t_0)+M(f-f_0)+N/\tau(t-t_0)$$

where $\tau$ = the wavelength of the particular signal. The lines of equal Faraday rotation, in degrees, are plotted along the X, Y axes to aid in the determination of the particular Faraday rotation as at a corresponding optical aperture 52 of data mask 50—see FIG. 7.

Figure 7:
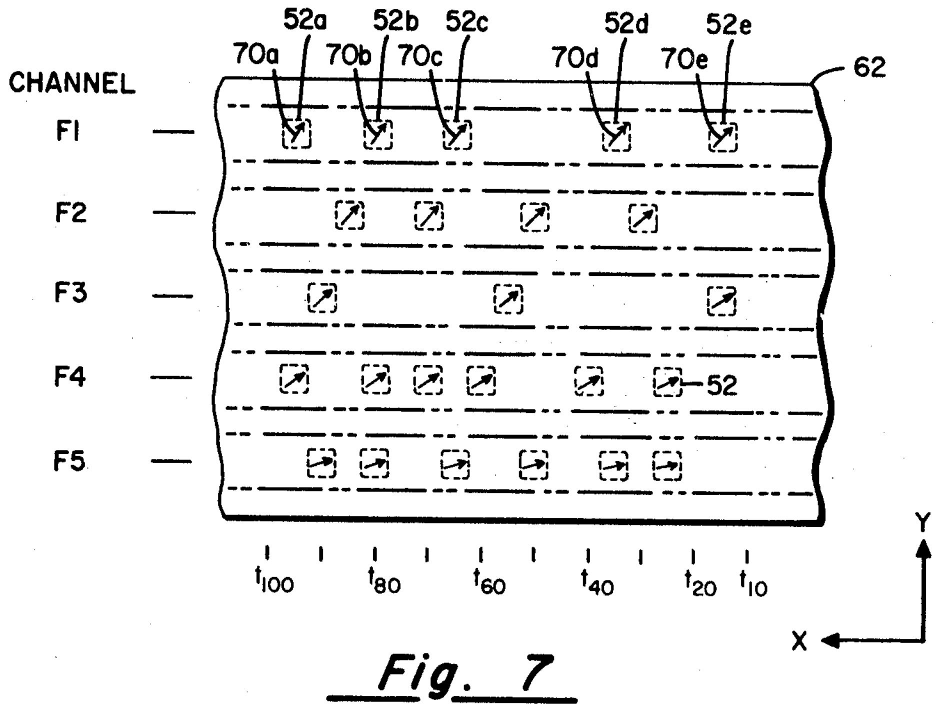
FIG. 7 is an illustration of the spatial distribution in the data plane of FIG. 5 of the Faraday rotation obtained by the pulse patterns of the prescribed linear waveforms of FIG. 3.
Figure 8:
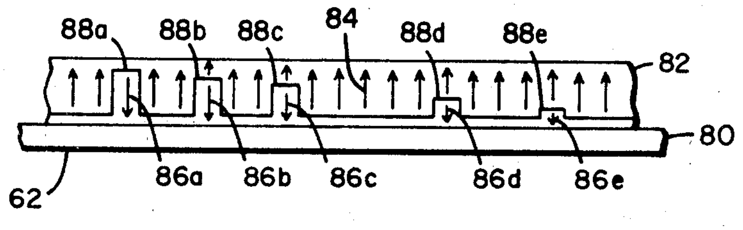
FIG. 8 is a diagrammatic illustration of the magnetization polarization along channel F1 in the data plane of FIG. 7.

With particular reference to FIG. 7 there is presented an illustration of the spatial distribution in data plane 62 of the Faraday rotation, illustrated by the particular vector orientations at the corresponding optical apertures 52 of data mask 50, effected by the recording of the received data signals along channels F1–F5. The vector orientations are illustrated as having maximum Faraday rotations as noted in FIG. 6. With particular reference to FIG. 8 there is presented a diagrammatic illustration of the magnetization polarization, e.g., along channel F1. Data plane 62 is illustrated as consisting of a transparent base 80 having a magnetizable layer 82 affixed thereto. Magnetizable layer 82 is uniformly established in an initial magnetic state represented by the upward arrow 84 with the recording of the information therein established by the degree or level of partial switching of the magnetizable layer 82 through the thickness thereof as denoted by the relative amplitudes of the reversely magnetized areas denoted by the downward arrows 86. These areas of substantially reversed magnetization, 88*a*, 88*b*, 88*c*, 88*d*, 88*e*, are indicated as having relative amplitudes which, to an orthogonally incident light beam, cause a corresponding relative Faraday rotation of the light beam as it passes therethrough. This degree of relative Faraday rotation, with respect to channel F1 is diagrammatically illustrated by vectors 70*a*, 70*b*, 70*c*, 70*d*, 70*e*, which correspond to the areas of the relatively reversed magnetization in layer 82 as illustrated by arrows 86*a*, 86*b*, 86*c*, 86*d*, 86*e*, respectively. The apertures 52 *a*, 52*b*, 52*c*, 52*d*, 52*e* in data mask 50 (see FIG. 2) are superimposed upon the associated areas of channel F1 (see FIG. 7) to diagrammatically illustrate the relationship of the data mask 50 and the data plane 62 as they relate to the effect upon an orthogonally incident light beam.

Figure 9:
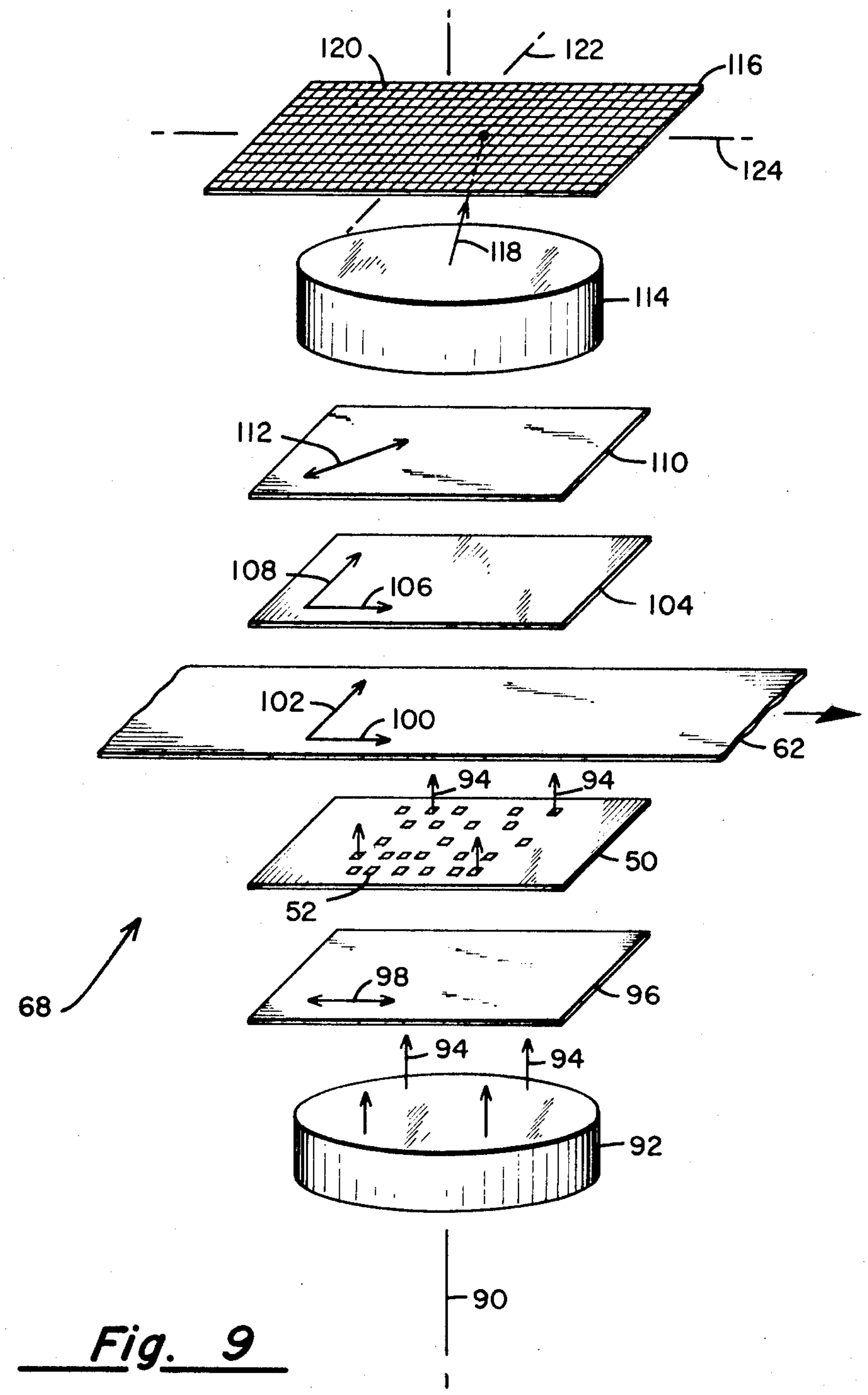
FIG. 9 is a diagrammatic illustration of the magneto-optic phase-correlator of the present invention.

With particular reference to FIG. 9 there is presented a diagrammatic illustration of the magneto-optic phase correlator 68 of the present invention. Correlator 68 includes a plurality of elements aligned along the linear optical axis 90 for causing a light beam passing therethrough to be focused, or not focused, upon a detector array in a manner representative of the correlation between two sets of data. Initially, coherent light source 92 generates a light beam, represented by vectors 94, which is directed parallel to optical axis 90. Light beam 94 is directed orthogonally incident to input filter 96 having a polarization axis 98 in the plane thereof. Input filter 96 polarizes the coherent light beam 94 along the polarization axis 98 applying said polarized light beam orthogonally incident to data mask 50.

Data mask 50, as more particularly discussed with particular reference to FIG. 5, has a plurality of optical apertures 52 therethrough that spatially conform to the individual pulse patterns of FIG. 1. Accordingly, the polarized light beam passes through the optical apertures 52 of data mask 50 generating a plurality B of first polarized axis light beams whose spatial distribution conforms to the spatial distribution of the optical apertures 52 in data mask 50.

The plurality B of first polarized axis light beams are directed orthogonally incident to data plane 62 which, as discussed with particular reference to FIGS. 6, 7 is transparent to the orthogonally incident light beam polarized along the first polarization axis 98 but which, along a time axis 100, parallel to first polarization axis 98, and the orthogonally oriented frequency axis 102, both in the plane of data plane 62, have recorded therein along the channels F1–F5 parallel to the time axis 100 varying, analoglike, levels of partial switching of its magnetization that corresponds to the level of the received data signals of channels F1–F5. The plurality of first polarized axis 98 light beams 94 being orthogonally incident to data plane 62 are subjected to a Faraday rotation of each of said first polarized axis 98 light beams 94, which degree of rotation corresponds to the level of partial switching of the magnetization of data plane 62 in the area thereof through which each of the polarized axis 98 light beams 96 pass through. Thus, the plurality of first polarized axis 98 light beams 94 upon passing through data plane 62 are rotated different degrees, such as discussed with particular reference to FIG. 6.

These plurality B of rotated light beams are then directed orthogonally incident to quarter wave plate 104 having a first optical axis 106, parallel to first polarization axis 98, and a second optical axis 108, orthogonal to first optical axis 106, with both optical axes 106, 108 being in the plane of quarter wave plate 104. Each of the plurality of orthogonally incident light beams that are rotated upon their passage through data plane 62 upon passing through quarter wave plate 104, form a respectively associated componented light beam having two orthogonal components, one along each of the optical axes 106, 108. The componented light beams, having two orthogonal components with respect to the axes 106, 108 of quarter wave plate 104, have a different velocity therethrough whereby the plurality of orthogonally incident Faraday rotated light beams are no longer linearly polarized but are now elliptically polarized due to the different velocities of the componented light beams through quarter wave plate 104.

The plurality B of componented light beams are then directed orthogonally incident to analyzer filter 110 having a transmission axis 112 in the plane thereof that bisects the mutually orthogonal optical axes 106, 108 of quarter wave plate 104. The plurality of componented light beams, upon passing through analyzer filter 110, are repolarized along transmission axis 112. However, the repolarization along transmission axis 112 by analyzer filter 110 alters the phases of the componented light beams as they pass therethrough. Accordingly, the combination of the quarter wave plate 104 and the analyzer filter 110 operates upon the plurality of componented light beams whose beams of polarization have been rotated by different angles by data plane 52 and alters such light beams such that they then have the same plane of polarization, transmission axis 112, but have undergone phase shifts that are related to the Faraday rotation of the individual componented light beam.

The plurality B of light beams of a plane polarization along transmission axis 112 and of different relative phases are directed orthogonally incident to focusing optics 114 which focuses the plurality of such orthogonally incident light beams upon detector array 116 in a manner that is a function of the correlation of the data recorded in data mask 50 and data plane 62. If the phases of the plurality of light beams emitted from analyzer filter 110 are linearly varying along the mutually orthogonal time and frequency axes 100, 102 of data plane 62, the plurality of light beams emitted from analyzer filter 110 have a type of coherent scattering that defines a focused light beam 118. Light beam 118 is altered or angulated from optical axis 90 as a function of the linear variation of the data recorded in data mask 50 and data plane 62 along the orthogonal axes 100, 102.

Detector array 116 may consist of a plurality of photo detecting cells 120 arranged in a matrix array along orthogonal X, Y axes 122, 124 intersecting optical axis 90 in the plane of detector array 116. Orthogonal X, Y axes 122, 124 may represent parameters related to the multichannel data signal time/frequency relationship. With respect to converter 70 of FIG. 6, the output of detector array 116 may be converted to a digital equivalence of the X, Y parameters, or, alternatively, may be represented by analog values proportional to the deflection of the focused light beam 118 away from axes 122, 124.

What is claimed is:

1. A magneto-optic phase correlator, comprising:

means for generating a phase-coherent first polarization axis polarized light beam the spatial characteristic of which, in a plane across its optical axis, represents a known data signal;

a magnetizable data plane, in the path of said polarized light beam, having data recorded along each of two orthogonal data axes in the plane thereof which data are recorded in said data plane as respectively associated varying levels of partial switching of the magnetization through the thickness thereof and along said data axes for generating a corresponding varying angular degree of Faraday rotation of said polarized light beam;

a quarter wave plate, in the path of said Faraday rotated light beam, for componenting said Faraday rotated light beam along two orthogonal optical axes that are in the plane thereof; and, an analyzer filter, in the path of said componented light beam, having a second polarization axis in the plane thereof for repolarizing said componented light beam along said second polarization axis and generating a corresponding varying phase shift in said repolarized light beam.

2. The magneto-optic phase correlator of claim 1 in which said polarized light beam is comprised of a plurality of separate, parallel light beams and said analyzer filter generates corresponding, linearly varying, phase shifts in said light beams along said two orthogonal optical axes.

3. The magneto-optic phase correlator of claim 2 in which its optical axis and said light beams are linearly aligned.

4. The magneto-optic phase correlator of claim 1 in which said polarized light beam is directed orthogonally incident to the plane of said data plane.

5. The magneto-optic phase correlator of claim 4 in which the planes of said data plane and of said quarter wave plate are parallel.

6. The magneto-optic phase correlator of claim 5 in which each of said orthogonal data axes are parallel to a respective one of said optical axes.

7. The magneto-optic phase correlator of claim 6 in which said first polarization axis is parallel to one of said two orthogonal optical axes.

8. The magneto-optic phase correlator of claim 7 in which the planes of said quarter wave plate and of said analyzer filter are parallel.

9. The magneto-optic phase correlator of claim 8 in which said second polarization axis bisects said two orthogonal optical axes at an angle of 45°.

10. The magneto-optic phase correlator of claim 1 in which the said levels of partial switching are in an analoglike form.

11. A magneto-optic phase correlator, comprising:

means for generating a plurality B of separate, parallel, phase-coherent, first polarization axis polarized light beams whose spatial characteristics are defined along two orthogonal data axes in a plane normal to their paths and represent a first data signal;

a magnetizable data plane, in the path of said polarized light beams, in which a signal is recorded as an associated analoglike varying level of partial switching of the magnetization through the thickness thereof and along said two orthogonal data axes, which level provides a corresponding analoglike varying angular degree of Faraday rotation of each of said polarized light beams when directed orthogonally incident to the plane of said data plane;

a quarter wave plate, in the path of said Faraday rotated light beams, for componenting each of said Faraday rotated light beams along two orthogonal optical axes that are in the plane of said quarter wave plate, one of which optical axes is parallel to said first polarization axis; and, an analyzer filter, in the path of said componented light beams, having a second polarization axis in the plane thereof that bisects said two orthogonal optical axes for repolarizing said Faraday rotated light beams along said second polarization axis and generating a corresponding analoglike varying phase shift in each of said repolarized light beams, with respect to the corresponding one of said polarized light beams, that corresponds to said associated analoglike varying level of partial switching.

12. The magneto-optic phase correlator of claim 11 in which the planes of said data plane, of said quarter wave plate and of said analyzer filter are aligned in a parallel, superposed manner along the linear optical axis of said correlator.

13. The magneto-optic phase correlator of claim 12 in which the same second polarization axis bisects said two orthogonal optical axes at an angle of 45°.

14. A magneto-optic phase correlator, comprising:

means for generating a plurality B of separate, parallel, phase-coherent, first polarization axis polarized light beams whose spatial distribution along two orthogonal data axes in a plane normal to their paths conforms to a time duration sample of a corresponding plurality B of first signals;

a magnetizable data plane, in the path of said polarized light beams, having a plurality F of data channels in which an associated plurality B of second signals are recorded along said two orthogonal data axes as respectively associated linearly varying levels of partial switching of the magnetization through the thickness thereof, which levels provide a corresponding linearly varying angular degree of Faraday rotation of said polarized light beams;

a quarter wave plate, in the path of said Faraday rotated light beams, for componenting each of said Faraday rotated light beams along two orthogonal optical axes that are in the plane of said quarter wave plate; and, an analyzer filter, in the path of said componented light beams, having a second polarization axis in the plane thereof for repolarizing each of said componented light beams along said second polarization axis and generating a corresponding linearly varying phase shift in each of said repolarized light beams along said two orthogonal data axes.

15. The magneto-optic phase correlator of claim 14 in which said data plane is a tapelike recording medium that is continuously driven along a plane normal to the parallel paths of said polarized light beams.

16. The magneto-optic phase correlator of claim 14 in which said plurality F of data channels are each of different frequency band widths of linearly increasing frequency.

17. The magneto-optic phase correlator of claim 14 in which said plurality B of second signals are pulselike having a linearly varying amplitude over said spatial distribution of said polarized light beams.

18. The magneto-optic phase correlator of claim 14 in which said polarized light beams are directed orthogonally incident to the plane of said data plane.

19. The magneto-optic phase correlator of claim 18 in which the planes of said data plane and of said quarter wave plate are parallel.

20. The magneto-optic phase correlator of claim 19 in which each of said data axes are parallel to a respective one of said optical axes.

21. The magneto-optic phase correlator of claim 20 in which said first polarization axis is parallel to one of said two orthogonal optical axes.

22. The magneto-optic phase correlator of claim 21 in which the planes of said quarter wave plate and of said analyzer filter are parallel.

23. The magneto-optic phase correlator of claim 22 in which said second polarization axis bisects said two orthogonal optical axes at an angle of 45°.

24. The magneto-optic phase correlator of claim 14 in which the said levels of partial switching in each of said data channels are in an analoglike form.

25. A magneto-optic phase correlator, comprising:

means for generating a phase-coherent light beam the spatial characteristic of which, in a plane across its optical axis, represents a known data signal;

a magnetizable data plane;

means for recording a received data signal in the magnetization of said data plane along two orthogonal received data signal axes;

said received data signal recorded as a linearly varying level of partial switching of the magnetization of said data plane through the thickness thereof, said linearly varying level of partial switching providing a corresponding linearly varying angular degree of Faraday rotation of an orthogonally incident light beam;

a polarized input filter having a first polarization axis in the plane thereof and which is parallel to one of said two orthogonal received data signal axes;

said plane coherent light beam orthogonally incident to the plane of said input filter for polarizing said phase-coherent light beam along said first polarization axis;

said polarized light beam orthogonally incident to the plane of said data plane;

said polarized light beam subjected to a linearly varying Faraday rotation, the linearity of which corresponds to the linearly varying level of partial switching of the magnetization of said data plane along said two orthogonal received data signal axes;

a quarter wave plate having two orthogonal optical axes in the plane thereof, one of which is parallel to said first polarization axis;

said Faraday rotated light beam orthogonally incident to the plane of said quarter wave plate;

said quarter wave plate componenting said Faraday rotated light beam for forming a respectively associated componented light beam having two orthogonal components, a separate component along each of said orthogonal optical axes;

an analyzer filter having a second polarization axis in the plane thereof that bisects said two orthogonal optical axes;

said componented light beam orthogonally incident to the plane of said analyzer filter;

said analyzer filter repolarizing said componented light beam along said second polarization axis and shifting the phase of said componented light beam, with respect to said polarized light beam, for forming a repolarized light beam of linearly varying phase shifts having a linearly varying relationship along said two orthogonal optical axes;

a detector array;

means for focusing said repolarized light beam upon said detector array;

means coupled to said detector array for providing an indication of the correlation between said known data signal and said received data signal as a function of the degree of said linearly varying relationship of the phase shift of said repolarized light beam.

26. The magneto-optic phase correlator of claim 25 wherein the planes of said input filter, data plane, quarter wave plate and analyzer filter are aligned in a parallel, superposed manner along the linear optical axis of said correlator with said light beams being directed orthogonally incident to the planes thereof.

27. A magneto-optic phase correlator, comprising:

a data mask having a plurality B of optical apertures, the spatial distribution of which along two orthogonal data axes conforms to a time-duration sample of a plurality F of separate known data signals;

a magnetizable data plane;

means for recording a plurality F of separate received data signals in said data plane along two orthogonal data axes;

said plurality of F separate received data signals recorded in F separate associated data channels in said data plane as analoglike varying levels of partial switching of the magnetization of said data plane through the thickness thereof, said levels of partial switching providing a corresponding analoglike varying angular degree of Faraday rotation of an orthogonally incident light beam;

a polarized input filter having a first polarization axis in the plane thereof;

means for applying an orthogonally incident phase-coherent light beam to said input filter for polarizing said phase-coherent light beam along said first polarization axis;

said polarized light beam orthogonally incident to the plane of said data mask for forming a plurality B of separate, parallel, phase-coherent, first polarization axis polarized light beams whose spatial distribution in a plane normal to their parallel paths conforms to the spatial distribution of the optical apertures in said data mask;

said plurality B of polarized light beams orthogonally incident to the plane of said data plane;

each of said plurality B of polarized light beams subjected to a Faraday rotation, the analoglike varying angular degree of which corresponds to the analoglike varying level of partial switching at the respective incident portion of said data mask;

a quarter wave plate having two orthogonal optical axes in the plane thereof, one of which is parallel to said first polarization axis;

said plurality B of Faraday rotated light beams orthogonally incident to the plane of said quarter wave plate;

said quarter wave plate componenting said plurality B of Faraday rotated light beams for forming a plurality B of respectively associated componented light beams having two orthogonal components, a separate component along each of said two orthogonal optical axes;

an analyzer filter having a second polarization axis in the plane thereof that bisects said two orthogonal optical axes;

said plurality B of componented light beams orthogonally incident to the plane of said analyzer filter;

said analyzer filter repolarizing each of said plurality B of componented light beams along said second polarization axis and shifting the phase of each of said plurality B of componented light beams, with respect to said plurality B of polarized light beams, for forming a plurality B of respectively associated repolarized light beams of respectively associated phase shifts having an analoglike varying relationship along said two orthogonal optical axes;

a detector array;

means for focusing said plurality B of repolarized light beams upon said detector array;

means coupled to said detector array for providing an indication of the correlation between said received data signals and said known data signals as a function of the degree of the analoglike varying relationship of the phase shifts of said repolarized light beams along said two orthogonal optical axes.

28. The magneto-optic phase correlator of claim 27 wherein the planes of said input filter, data plane, quarter wave plate and analyzer filter are aligned in a parallel, superposed manner along the linear optical axis of said correlator with said light beams being directed orthogonally incident to the planes thereof.

* * * * *

UNITED STATES PATENT OFFICE
CERTIFICATE OF CORRECTION

Patent No. 3,639,744 Dated February 1, 1972

Inventor(s) Fred G. Hewitt

It is certified that error appears in the above-identified patent and that said Letters Patent are hereby corrected as shown below:

Column 6, line 68, after "each of said", cancel "orthogonal" ; line 69, after "one of said" insert -- two orthogonal -- . Column 7, line 41, "same" should read -- said -- ; line 70, "tapelike" should read -- tape-like -- ; Column 8, line 2, "pulselike" should read -- pulse-like -- . Column 7, lines 5, 14, 17, 32, 35, Column 8, line 25, Column 9, lines 24, 27, and Column 10, lines 1, 26, 34 and line 2, "analoglike" each occurrence, should read -- analog-like -- .

Signed and sealed this 12th day of December 1972.

(SEAL)
Attest:

EDWARD M.FLETCHER,JR.
Attesting Officer

ROBERT GOTTSCHALK
Commissioner of Patents